(12) United States Patent  (10) Patent No.: US 9,262,020 B2
Lai  (45) Date of Patent: Feb. 16, 2016

(54) ELECTRONIC DEVICE WITH CAPACITIVE TOUCH-SENSITIVE DISPLAY

(75) Inventor: Jackson Chi Sun Lai, Mississauga (CA)

(73) Assignee: BlackBerry Limited, Waterloo (CA)

( * ) Notice: Subject to any disclaimer, the term of this patent is extended or adjusted under 35 U.S.C. 154(b) by 446 days.

(21) Appl. No.: 13/360,223

(22) Filed: Jan. 27, 2012

(65) Prior Publication Data

US 2013/0194224 A1   Aug. 1, 2013

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0412* (2013.01); *G06F 3/041* (2013.01)

(58) Field of Classification Search
USPC ................................. 345/173, 174; 178/18.06
See application file for complete search history.

(56) References Cited

U.S. PATENT DOCUMENTS

| | | | |
|---|---|---|---|
| 4,857,907 A | 8/1989 | Koden | |
| 5,805,247 A * | 9/1998 | Oh-e et al. | 349/42 |
| 5,986,401 A | 11/1999 | Thompson et al. | |
| 6,473,140 B1 | 10/2002 | Mizobata et al. | |
| 2003/0222857 A1 | 12/2003 | Abileah | |
| 2004/0141096 A1 | 7/2004 | Mai | |
| 2008/0062140 A1 * | 3/2008 | Hotelling et al. | 345/173 |
| 2009/0040192 A1 * | 2/2009 | Haga | 345/174 |
| 2009/0135157 A1 * | 5/2009 | Harley | 345/174 |
| 2009/0160822 A1 * | 6/2009 | Eguchi et al. | 345/174 |
| 2010/0123680 A1 | 5/2010 | Lee et al. | |
| 2010/0289770 A1 * | 11/2010 | Lee et al. | 345/174 |
| 2010/0295804 A1 * | 11/2010 | Takeuchi et al. | 345/173 |
| 2011/0242444 A1 * | 10/2011 | Song | 349/43 |
| 2011/0298727 A1 * | 12/2011 | Yousefpor et al. | 345/173 |
| 2011/0304571 A1 * | 12/2011 | Kim et al. | 345/173 |
| 2012/0013544 A1 | 1/2012 | Philipp | |
| 2012/0218482 A1 * | 8/2012 | Hwang et al. | 349/12 |
| 2013/0044074 A1 * | 2/2013 | Park et al. | 345/174 |

FOREIGN PATENT DOCUMENTS

| | | |
|---|---|---|
| EP | 1422601 A1 | 5/2004 |
| WO | 2010137727 A1 | 12/2010 |
| WO | 2011/055809 A1 | 5/2011 |
| WO | 2011080861 A1 | 7/2011 |
| WO | 2011/156418 A1 | 12/2011 |

OTHER PUBLICATIONS

International Search Report dated Mar. 18, 2013, issued in respect of corresponding International Patent Application No. PCT/CA2013/050055.
Extended European Search Report dated May 29, 2012, issued from the corresponding European patent application No. 12152958.0.
Office Action dated Mar. 6, 2015, issued from corresponding EP patent application No. 12152958.0.

\* cited by examiner

*Primary Examiner* — Jason Olson
*Assistant Examiner* — Sosina Abebe
(74) *Attorney, Agent, or Firm* — Geoffrey deKleine; Borden Ladner Gervais LLP

(57) ABSTRACT

A touch-sensitive display includes a substrate, pixel electrodes disposed on the substrate, scanning electrodes interspersed with the pixel electrodes, sense electrodes spaced from the scanning electrodes, and a display material disposed between the scanning electrodes and the sense electrodes.

14 Claims, 4 Drawing Sheets

ELECTRONIC DEVICE WITH CAPACITIVE TOUCH-SENSITIVE DISPLAY

FIELD OF TECHNOLOGY

The present disclosure relates to electronic devices including, but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and may have limited space for user input and output. The information displayed on the display may be modified depending on the functions and operations being performed.

Improvements in electronic devices with touch-sensitive displays are desirable.

DETAILED DESCRIPTION

Figure 1:
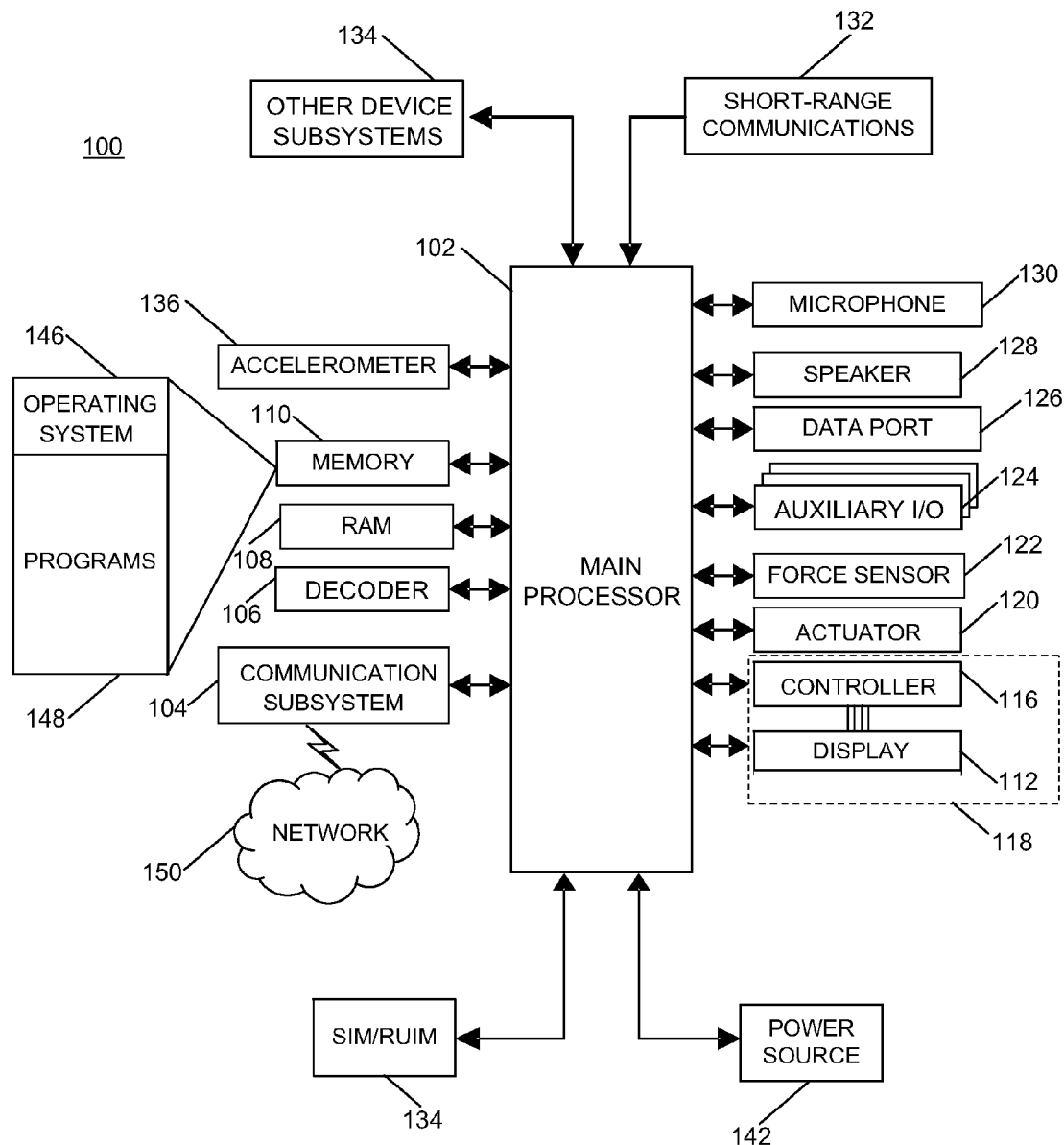
FIG. 1 is a block diagram of a portable electronic device in accordance with the disclosure.

The following describes a touch-sensitive display and an electronic device that includes the touch-sensitive display. The touch-sensitive display includes a substrate, pixel electrodes disposed on the substrate, scanning electrodes interspersed with and electrically isolated from the pixel electrodes, sense electrodes spaced from the scanning electrodes, and a display material disposed between the pixel electrodes and the sense electrodes.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, which is a portable electronic device in the embodiments described herein. Examples of portable electronic devices include mobile, or handheld, wireless communication devices such as pagers, cellular phones, smartphones, wireless organizers, personal digital assistants, wirelessly enabled notebook computers, tablet computers, mobile internet devices, electronic navigation devices, and so forth. The portable electronic device may also be a portable electronic device without wireless communication capabilities, such as a handheld electronic game device, digital photograph album, digital camera, media player, e-book reader, and so forth.

A block diagram of an example of a portable electronic device 100 is shown in FIG. 1. The electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a touch-sensitive display 118, an auxiliary input/output (I/O) subsystem 124, a data port 126, a speaker 128, a microphone 130, short-range communications 132, and other device subsystems 134. Input via a graphical user interface is provided via the touch-sensitive display 118. The touch-sensitive display 118 includes a display 112 and at least one electronic controller 116 that is utilized to interact with the processor 102. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

One or more touches, also known as touch contacts or touch events, may be detected by the touch-sensitive display 118. The processor 102 may determine attributes of the touch, including a location of a touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A signal is provided to the controller 116 in response to detection of a touch. A touch may be detected from any suitable input member, such as a finger, thumb, appendage, or other objects, for example, a stylus, pen, or other pointer. Multiple simultaneous touches may be detected.

Figure 2:
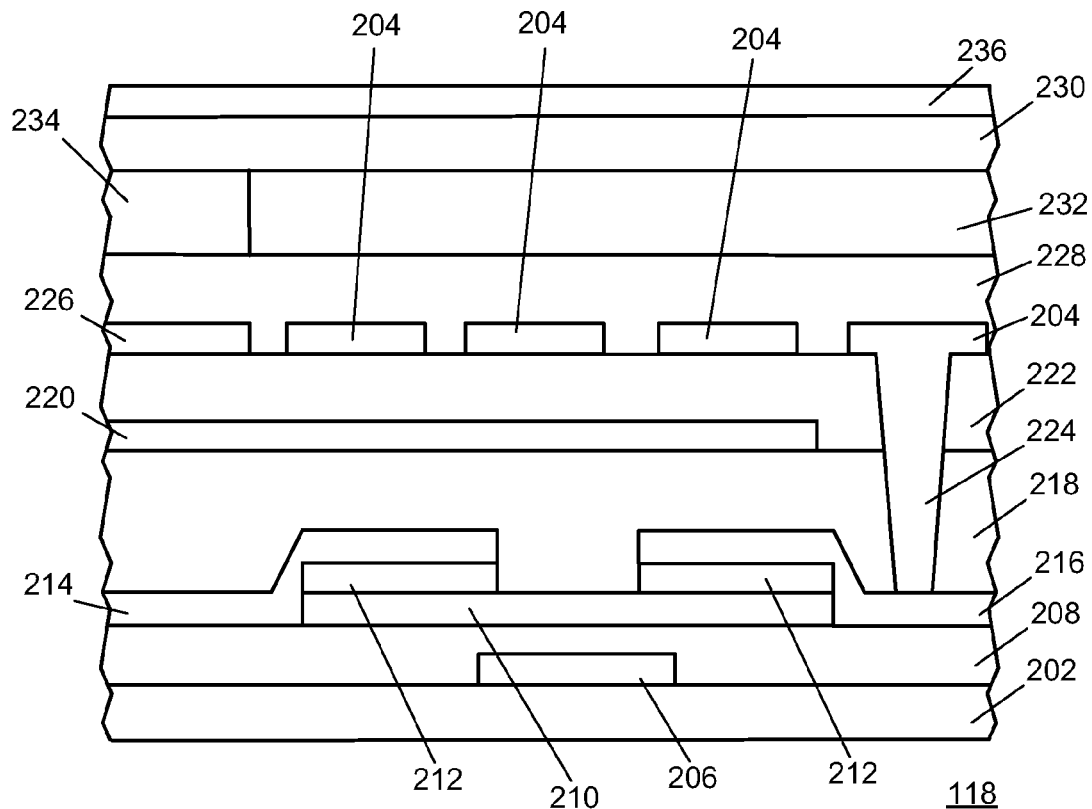
FIG. 2 is a partial cross section of one example of a touch-sensitive display in accordance with the disclosure.

A partial cross section of one example of the touch-sensitive display 118 is shown in FIG. 2. In the example illustrated in FIG. 2, the touch-sensitive display 118 comprises an In-Plane Switching (IPS) liquid crystal display (LCD) that includes a thin-film transistor (TFT) structure and a color filter. The TFT structure includes a glass substrate 202 and intervening layers between the glass substrate and pixel electrodes 204. The glass substrate 202 and the intervening layers provide the substrate on which the pixel electrodes 204 are disposed. The intervening layers may include gate lines 206, a gate insulator 208, amorphous silicon semiconductor film 210, n-type amorphous silicon ($n^+$-a-Si) film 212, source/drain electrodes 214, 216, a lower insulator 218, also known as an inter-layer dielectric (ILD), common electrodes 220, and an upper insulator 222. The LCD display is not limited to an amorphous silicon display. The LCD display may alternatively be fabricated using other large area electronics technology such as low-temperature polysilicon (LTPS), metal oxide semiconductor, or organic back-plane display.

Figure 3:
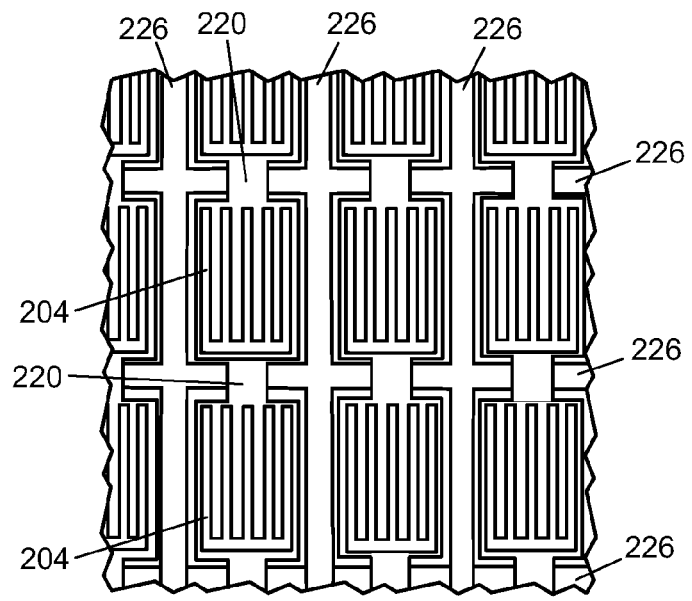
FIG. 3 is a top view illustrating electrodes of the touch-sensitive display in accordance with the disclosure.

The pixel electrodes 204 are disposed along the upper insulator 222 and are spaced apart in an array on the upper insulator 222. The pixel electrodes 204 may be coupled to the source/drain electrodes 214/216 utilizing vias 224 that extend from the pixel electrodes 204 to the source/drain electrodes 214/216. Scanning electrodes 226, also known as drive electrodes, that are utilized for mutual capacitive touch sensing are interspersed with the pixel electrodes 204, as illustrated in FIG. 2 and FIG. 3. The scanning electrodes 226 are spaced from the pixel electrodes 204 to electrically isolate the scanning electrodes 226 from the pixel electrodes 204. Fewer scanning electrodes 226 are utilized than pixel electrodes 204 and the scanning electrodes 226 are interspersed at regular intervals such that several pixel electrodes 204 are disposed between scanning electrodes 226. For example, about 10 scanning electrodes 226 may be distributed across the display and the pixel electrodes 204 are disposed between the scanning electrodes 226. The scanning electrodes 226 and the pixel electrodes 204 may be deposited at the same time, for example, by vapor depositing a single layer of conductive material and patterning to provide both scanning electrodes 226 and pixel electrodes 204.

Display material, which is liquid crystal 228 in the example of an IPS LCD, is disposed between the pixel electrodes 204 and the color filter. The color filter includes color filter material 232 and black matrix material 234 disposed on the glass substrate 230. The RGB (red-green-blue) elements of the color filter are separated by black matrix material 234. The black matrix material 234 is disposed on the glass substrate 230 where the color filter material 232 is not disposed.

The scanning electrodes 226 are aligned with the black matrix material 234 such that the scanning electrodes 226 are located under the black matrix material 234 of the touch-sensitive display 118 in the orientation illustrated in FIG. 2. The scanning electrodes 226 are electrically separated from the pixel electrodes 204 to reduce noise. Because the scanning electrodes 226 are located under the black matrix material 234, the scanning electrodes 226 are disposed in areas that are not utilized to display information and optical properties are improved by comparison to a device in which the scanning electrodes 226 are not disposed under the black matrix material 234.

Sense electrodes 236, also known as receiving electrodes, that are utilized for mutual capacitive touch sensing are disposed on the color filter such that the color filter is adjacent to the sense electrodes 236 and the sense electrodes 236 extend over the black matrix material 234. The sense electrodes 236 may be wide compared to the spacing between the sense electrodes 236 and compared to the scanning electrodes 226 to facilitate shielding of the touch-sensitive display 118. The sense electrodes 236 shield the display 112 from an external electric field, for example, from the environment, from electrical connections, or from other sources. The touch-sensitive display 118 may also include polarizers (not shown).

The upper insulator 222 is disposed between the common electrodes 220 and the pixel electrodes 204. The common electrodes 220 and the pixel electrodes 204 are display electrodes that control the liquid crystal 228. The data from the scanning electrodes 226 and the sense electrodes 236 is utilized to detect a touch on the touch-sensitive display 118. The pixel electrodes 204, the common electrodes 220, the scanning electrodes 226, and the sense electrodes 236 may comprise any suitable material, such as indium tin oxide (ITO).

The scanning electrodes 226 are generally parallel to each other and extend across the touch-sensitive display 118. The sense electrodes 236 are also generally parallel to each other and extend across the touch-sensitive display 118 such that the scanning electrodes 226 extend generally perpendicular to the sense electrodes 236 to form a grid pattern. The scanning electrodes 226 and the sense electrodes 236 cross over the scanning electrodes 226 at multiple locations that are utilized to detect a touch. Rather than generally parallel lines, the sense electrodes may alternatively be disposed in any other suitable shape or pattern.

The scanning electrodes 226 may be routed to the sides of the array to couple to the controller 116. For example, the scanning electrodes 226 may be routed to alternating sides of the array. Alternatively, the scanning electrodes 226 may be routed to one side of the array.

The scanning electrodes 226 and the sense electrodes 236 may be coupled to a touch controller 116 and the pixel electrodes 204 may be coupled to a separate controller, referred to as a display controller or display driver. The display controller may be coupled to the touch controller 116, to facilitate communication and to control and coordinate driving of the pixel electrodes 204 and the scanning electrodes 226.

The scanning electrodes 226 are driven with a drive signal that may be controlled by the controller 116. The sense electrodes 236 are utilized to measure the changes in electric field caused by an input member such as a finger touching the touch-sensitive display 118.

The scanning electrodes 226 are driven during the horizontal blanking time, such as when the display controller does not drive the source/drain electrodes 214, 216 that couple to the pixel electrodes 204. The source/drain electrodes 214, 216 are referred to as electrically quiet, reducing coupling and interference with touch sensing and facilitating enhanced touch sensing signal-to-noise ratio.

The source/drain electrodes 214, 216 are also not driven during the vertical blanking time that occurs at the beginning of each display frame. Touch sensing during the horizontal blanking time facilitates a higher touch panel report frequency than the frame rate.

Figure 4:
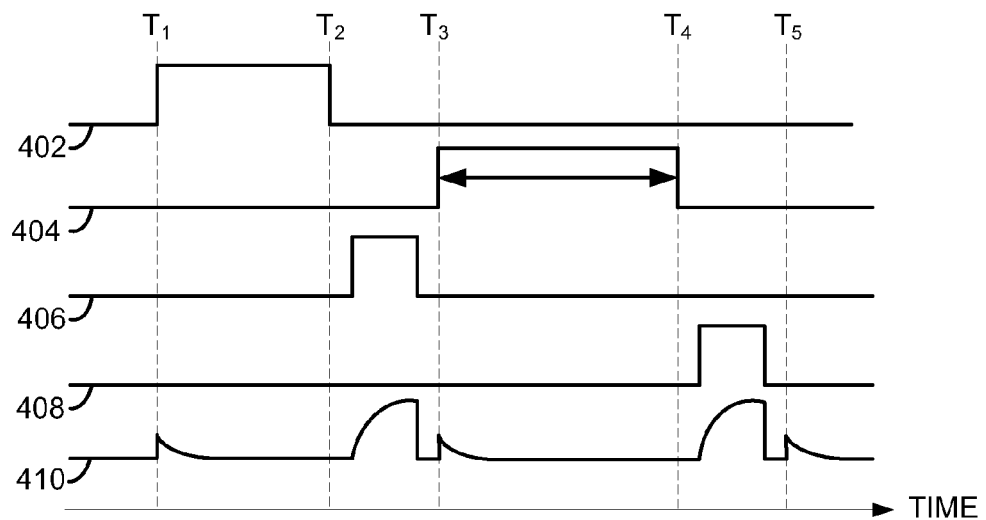
FIG. 4 is a diagram illustrating timing of driving electrodes of the touch-sensitive display in accordance with the disclosure.

Timing of driving the pixel electrodes 204 and driving the scanning electrodes 226 is illustrated in FIG. 4. One source/drain electrode 402 that couples to one of the pixel electrodes 204 is driven between time T1 and time T2 and another source/drain electrode 404 is driven between time T3 and time T4. The time between time T2 and time T3 and the time between time T4 and time T5 are times during which source/drain electrodes are not driven. A scanning electrode 406 of the scanning electrodes 226 is driven and one sense electrode 410 of the sense electrodes 236 is utilized for sensing during the horizontal blanking time between time T2 and time T3. Another scanning electrode 408 of the scanning electrodes 226 is driven and the sense electrode 410 is utilized for sensing during the horizontal blanking time between time T4 and time T5.

Optionally, the scanning electrodes 226, the sense electrodes 236, and the pixel electrodes 204 may be coupled to the same controller, rather than utilizing two separate controllers. The scanning electrodes 226 and the sense electrodes 236 are coupled to the controller to control drive signals from the controller to the scanning electrodes 226 and to receive signals from the sense electrodes 236 during touch sensing. The pixel electrodes 204 may also be coupled to the controller to control the pixel electrodes 204 such that the controller is utilized to control both the display of information and touch sensing.

The controller may be coupled to the gate lines 206 and the gate lines 206 may be selectively switched from coupling the controller to the pixel electrodes 204 to coupling the controller to the scanning electrodes 226 to drive the scanning electrodes 226 during the horizontal blanking times. The gate lines 206 may be coupled to the scanning electrodes 204 such that a drive signal to the pixel electrodes 204 is switched to drive the scanning electrodes 226.

Figure 5:
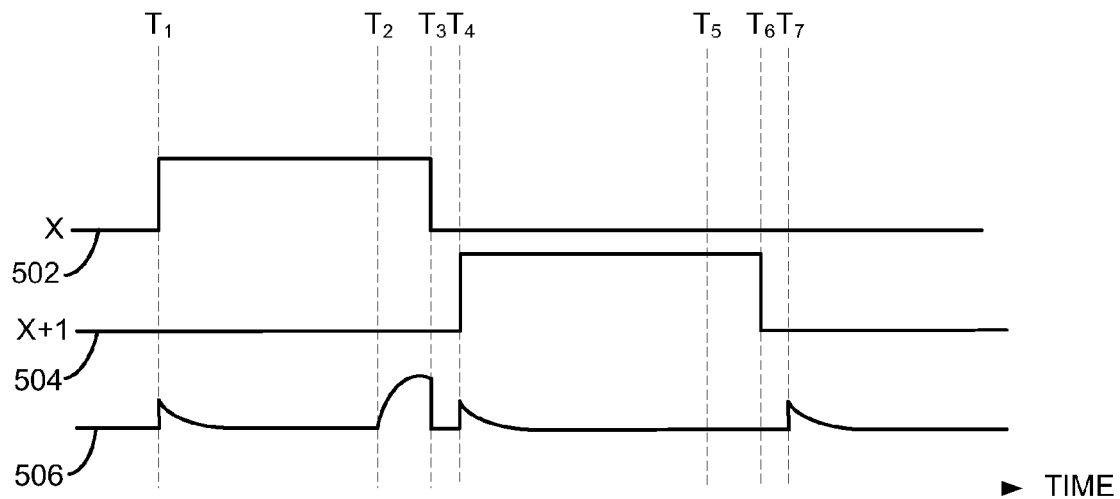
FIG. 5 is another diagram illustrating timing of driving electrodes of the touch-sensitive display in accordance with the disclosure.

Another example of timing of driving the pixel electrodes 204 and scanning electrodes 226, utilizing the gate lines 206, is illustrated in FIG. 5. One gate line 502 of the gate lines 206 for pixel row X is utilized to drive one of the pixel electrodes 204 between time T1 and time T2, and during that time, the sense electrode 236 is biased to act as the electrical shield. At time T2, the bias to the sense electrode 236 is switched to detect a touch until time T3. Another gate line 504 of the gate lines 206 for pixel row X+1 is utilized to drive another pixel electrode 204 between time T4 and time T5. At time T5, the sense electrode 236 is not switched to sense a touch, and thus, no sensing signal change exists between time T5 and time T6. A sense electrode 506 of the sense electrodes 236 is utilized for sensing during the horizontal blanking time between time T2 and time T3.

Figure 6:
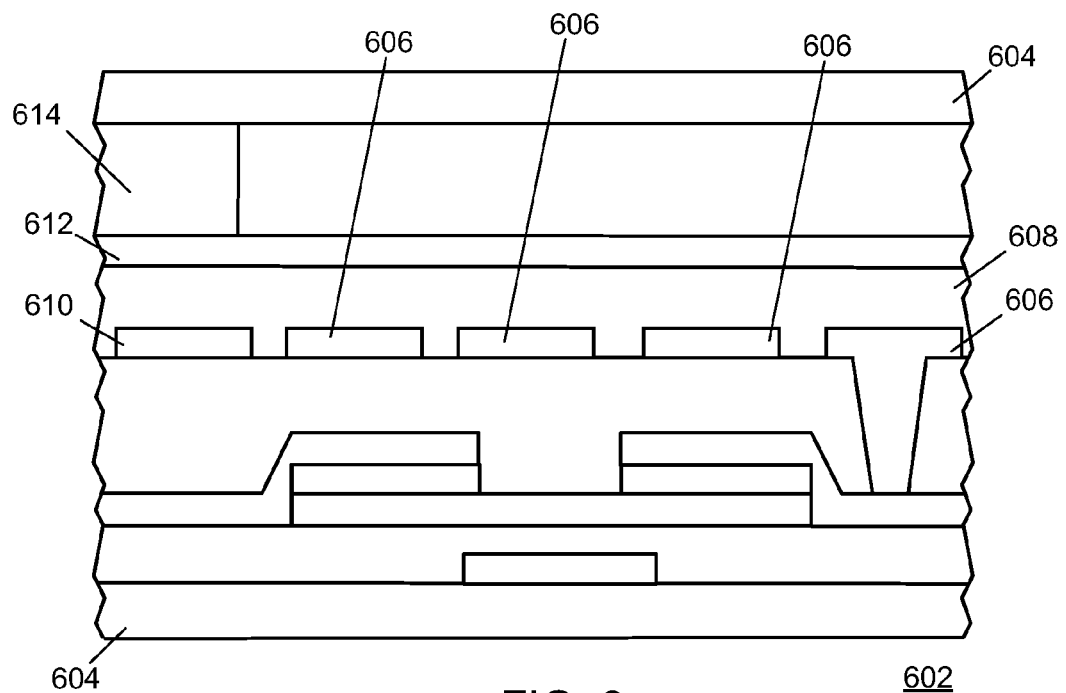
FIG. 6 is a partial cross section of one example of a touch-sensitive display in accordance with the disclosure.

A partial cross section of another example of the touch-sensitive display 602 is shown in FIG. 6. In this example, the touch-sensitive display 602 comprises a Vertical Alignment (VA) LCD that includes a TFT structure and a color filter. The TFT structure includes a glass substrate 604 and intervening layers between the glass substrate 604 and pixel electrodes 606. The glass substrate 604 and the intervening layers provide the substrate on which the pixel electrodes 606 are disposed. The intervening layers of the TFT structure are similar to those described above with reference to FIG. 2. In the VA LCD, however, the common electrodes are disposed between the color filter and the liquid crystal 608.

The scanning electrodes 610 are interspersed with and spaced from the pixel electrodes 606 to electrically isolate the scanning electrodes 610 from the pixel electrodes 606. The scanning electrodes 610 and the pixel electrodes 606 may be deposited at the same time, for example, in a single layer of conductive material that is patterned to provide both the scanning electrodes 610 and the pixel electrodes 606.

The common electrodes in the example of FIG. 6 are disposed on one side of the liquid crystal 608, and the pixel electrodes 606 are disposed on the opposite side of the liquid crystal 608. The sense electrodes 612 are disposed on the color filter, between the color filter and the liquid crystal 608. The sense electrodes 612 are interspersed with and spaced from the common electrodes such that the sense electrodes 612 are electrically isolated from the common electrodes. The sense electrodes 612 and the common electrodes may be deposited at the same time, for example, in a single layer of conductive material that is patterned to provide both the common electrodes and the sense electrodes 612.

Many of the features described above with reference to FIG. 2 are also applicable to or included in the touch-sensitive display of FIG. 6. For example, the scanning electrodes 610 are aligned with the black matrix material 614 such that the scanning electrodes 610 are located under the black matrix material 614 in the orientation of the touch-sensitive display 602 in the example of FIG. 6. The timing diagrams illustrated in FIG. 4 and FIG. 5 are also applicable to the touch-sensitive display 602 of FIG. 6.

Figure 7:
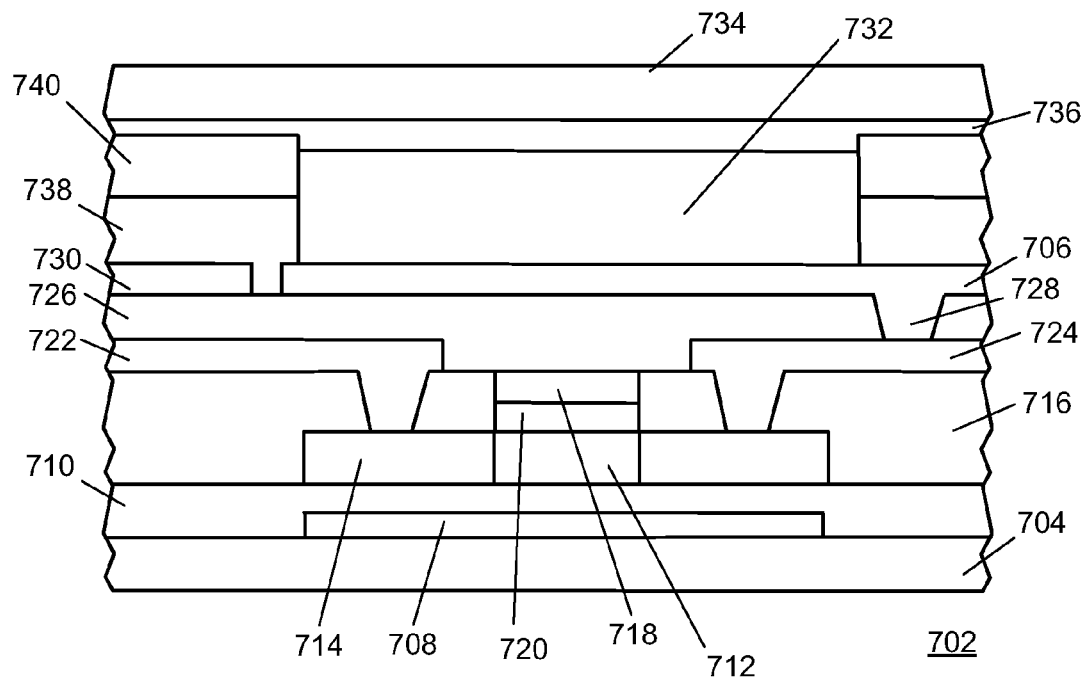
FIG. 7 is a partial cross section of one example of a touch-sensitive display in accordance with the disclosure.

A partial cross section of another example of a touch-sensitive display 702 is shown in FIG. 7. In this example, the touch-sensitive display 702 comprises an organic light-emitting diode (OLED) display that includes a glass substrate 704 and intervening layers between the glass substrate 704 and pixel electrodes 706, also referred to as anodes. The glass substrate 704 and the intervening layers provide the substrate on which the pixel electrodes 706 are disposed. The intervening layers may include a metal light shield 708, a buffer oxide 710, a low temperature polycrystalline silicon 712, p-type polycrystalline silicon diffusion regions that serve as transistor source and/or drain 714, a passivation layer 716, gate lines 718, a gate insulator 720, source/drain electrodes 722, 724, and an insulator 726.

The pixel electrodes 706 are disposed on the insulator 726. The pixel electrodes 706 may be coupled to the source/drain electrodes 722, 724 utilizing vias 728 that extend from the pixel electrodes 706 to the source/drain electrodes 722, 724. Scanning electrodes 730 are interspersed with the pixel electrodes 706. The scanning electrodes 730 are spaced from the pixel electrodes 706 to electrically isolate the scanning electrodes 730 from the pixel electrodes 706. The scanning electrodes 730 and the pixel electrodes 706 may be deposited at the same time, for example, in a single layer of conductive material that is patterned to provide both scanning electrodes 730 and the pixel electrodes 706.

Display material, which in the example of an OLED display includes an OLED arrangement 732, is disposed between the pixel electrodes 706 and an encapsulation cover 734, such as glass. Cathode electrodes are disposed between the encapsulation cover 734 and the OLED arrangement 732 and sense electrodes 736 are interspersed with and spaced from the cathode electrodes such that the sense electrodes 736 are electrically isolated from the cathode electrodes. The sense electrodes 736 and the cathode electrodes may be deposited at the same time, for example, in a single layer of conductive material that is patterned to provide both the cathode electrodes and the sense electrodes 736. The scanning electrodes are vertically aligned with the insulators 738, 740 disposed between the sense electrodes 736 and the scanning electrodes 730.

Many of the features described above with reference to FIG. 2 are also applicable to or included in the touch-sensitive display 702 of FIG. 7. The diagrams of FIG. 4 and FIG. 5 and the related description are also applicable to the touch-sensitive display 702 of FIG. 7.

The pixel electrodes and the scanning electrodes may be deposited at the same time. For example, the pixel electrodes and scanning electrodes may be deposited in one layer and may be patterned to provide the electrodes. The scanning electrodes are deposited in a same layer as the pixel electrodes and an additional display layer or an additional deposition is not required. The sense electrodes may be deposited to provide a shield, may be deposited with common electrodes, or may be deposited with cathode electrodes utilized with the display. The sense electrodes may be deposited in the same layer as the common electrodes or the cathode electrodes and the electrodes may be patterned such that an additional layer or an additional deposition is not required for the sense electrodes. The touch-sensitive display may be constructed with fewer layers, facilitating transmission of light and increasing display quality and clarity.

A touch-sensitive display includes a substrate, pixel electrodes disposed on the substrate, scanning electrodes interspersed with the pixel electrodes, sense electrodes spaced from the scanning electrodes, and a display material disposed between the pixel electrodes and the sense electrodes. An electronic device includes a touch-sensitive display. The touch-sensitive display includes a substrate, pixel electrodes disposed on the substrate, scanning electrodes interspersed with the pixel electrodes, sense electrodes spaced from the scanning electrodes, and a display material disposed between the pixel electrodes and the sense electrodes. At least one controller is coupled to the pixel electrodes, the scanning electrodes and the sense electrodes, and is configured to sense a touch on the touch-sensitive display during horizontal blanking time periods of the touch-sensitive display. An electronic device includes a touch-sensitive display. The touch-sensitive display includes a substrate, pixel electrodes and scanning electrodes disposed on the substrate, and sense electrodes spaced from the scanning electrodes. At least one controller is coupled to the pixel electrodes, the scanning electrodes and the sense electrodes, and is configured to control the pixel electrodes to control the display of information, and sense a touch on the touch-sensitive display.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A touch-sensitive display comprising:
   an insulator;
   pixel electrodes deposited directly on the insulator;
   drive electrodes deposited directly on the insulator and interspersed with the pixel electrodes such that the pixel electrodes and the drive electrodes are disposed in a same layer on the insulator;
   sense electrodes spaced from the drive electrodes;
   a display material and a color filter material disposed between the pixel electrodes and the sense electrodes;
   a black matrix material and the display material disposed between the drive electrodes and the sense electrodes;
   wherein the drive electrodes and the sense electrodes are utilized to detect touches on the touch-sensitive display.

2. The touch-sensitive display according to claim 1, comprising common electrodes disposed between the pixel electrodes and a substrate, and, wherein the insulator is disposed between the pixel electrodes and the common electrodes.

3. The touch-sensitive display according to claim 1, wherein the sense electrodes are utilized as a shield.

4. The touch-sensitive display according to claim 1, wherein the color filter is disposed adjacent the sense electrodes.

5. The touch-sensitive display according to claim 1, wherein the sense electrodes are disposed on a glass substrate and extend over the black matrix material.

6. The touch-sensitive display according to claim 5, wherein the drive electrodes are aligned with the black matrix material.

7. The touch-sensitive display according to claim 1, wherein the display material comprises liquid crystal.

8. The touch-sensitive display according to claim 1, comprising at least one controller coupled to the pixel electrodes, the sense electrodes, and the drive electrodes.

9. The touch-sensitive display according to claim 1, comprising a touch controller coupled to the drive electrodes and the sense electrodes, and a display controller in communication with the touch controller to control the pixel electrodes.

10. The touch-sensitive display according to claim 9, wherein the touch controller is operable to carry out touch sensing when the pixel electrodes are not driven.

11. The touch-sensitive display according to claim 9, wherein gate lines are utilized to drive the drive electrodes when the pixel electrodes are not driven.

12. An electronic device comprising:
    a touch-sensitive display comprising:
      an insulator;
      pixel electrodes deposited directly on the insulator;
      drive electrodes deposited directly on the insulator and interspersed with the pixel electrodes such that the pixel electrodes and the drive electrodes are disposed in a same layer on the insulator;
      sense electrodes spaced from the drive electrodes;
      a display material and a color filter disposed between the pixel electrodes and the sense electrodes;
      a black matrix material and the display material disposed between the drive electrodes and the sense electrodes;
    at least one controller coupled to the pixel electrodes, the drive electrodes and the sense electrodes, and configured to sense a touch on the touch-sensitive display during horizontal blanking time periods of the touch-sensitive display.

13. The electronic device according to claim 12, wherein the at least one controller comprises a first controller coupled to the pixel electrodes to control the display of information, and a second controller coupled to the drive electrodes and the sense electrodes and coupled to the first controller to sense a touch on the touch-sensitive display.

14. The electronic device according to claim 12, wherein the pixel electrodes are coupled to the at least one controller by gate lines and the gate lines are coupled to the drive electrodes.

* * * * *